(12) United States Patent
Conell et al.

(10) Patent No.: US 9,828,963 B2
(45) Date of Patent: Nov. 28, 2017

(54) POWERTRAIN SYSTEM WITH FAULT-TOLERANT COASTING CONTROL LOGIC

(71) Applicant: GM GLOBAL TECHNOLOGY OPERATIONS LLC, Detroit, MI (US)

(72) Inventors: Robert S. Conell, Sterling Heights, MI (US); Bob R. Powell, Jr., Birmingham, MI (US); Mark W. Verbrugge, Troy, MI (US); Scott W. Jorgensen, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 14/950,059

(22) Filed: Nov. 24, 2015

(65) Prior Publication Data

US 2017/0145976 A1    May 25, 2017

(51) Int. Cl.
*F02N 11/08*   (2006.01)
*F02N 11/10*   (2006.01)

(52) U.S. Cl.
CPC ...... *F02N 11/0803* (2013.01); *F02N 11/0866* (2013.01); *F02N 11/10* (2013.01); *B60Y 2300/18066* (2013.01); *B60Y 2400/47* (2013.01); *F02N 2200/06* (2013.01); *F02N 2200/0801* (2013.01); *F02N 2300/30* (2013.01)

(58) Field of Classification Search
CPC ..... B60W 10/08; B60W 10/06; Y10S 903/93; Y10S 903/903; Y10S 903/907; Y10S 903/904; Y10S 903/906; Y10S 903/902; Y10S 903/905; Y10S 903/908; B60Y 2200/92; B60Y 2400/47; Y02T 10/6286; Y02T 10/6239; Y02T 10/6221; Y02T 10/6252; Y02T 10/623; F02N 11/0803; F02N 11/0866; F02N 11/10; F02N 2200/0801; F02N 2200/06; F02N 2300/30
USPC ..... 180/65.21, 65.22, 65.225, 65.23, 65.235, 180/65.24, 65.245, 65.25, 65.26, 65.265, 180/65.27, 65.275, 65.28, 65.285, 65.29
See application file for complete search history.

(56) References Cited

U.S. PATENT DOCUMENTS

| 8,116,998 | B2 | 2/2012 | Hess |
| 2013/0141045 | A1 | 6/2013 | Karim et al. |
| 2015/0202984 | A1 | 7/2015 | Wyatt et al. |

*Primary Examiner* — Sizo Vilakazi
(74) *Attorney, Agent, or Firm* — Quinn IP Law

(57) ABSTRACT

A method for fault-tolerant coasting control of a powertrain system having an engine and a first energy storage system (ESS) includes receiving a real impedance value of the first ESS from a frequency analyzer device at a calibrated frequency while the engine is running, and comparing the real impedance value to a calibrated impedance. A coasting maneuver is enabled allowing the engine to turn off above a threshold speed when the real impedance value is less than the calibrated impedance. The method may include starting the engine using a second ESS in parallel with the first ESS to exit the coasting maneuver when the real impedance value exceeds the calibrated impedance. Subsequent execution of the coasting maneuver may be prevented as long as the real impedance value exceeds the calibrated impedance. A powertrain system includes the engine, starter motor, rechargeable ESS, frequency analyzer, and controller.

11 Claims, 2 Drawing Sheets

POWERTRAIN SYSTEM WITH FAULT-TOLERANT COASTING CONTROL LOGIC

TECHNICAL FIELD

The present disclosure relates to a powertrain system having fault-tolerant coasting control logic.

BACKGROUND

In a powertrain having an internal combustion engine coupled to a transmission, a 12-volt DC auxiliary starter motor can be selectively energized to rotate a crankshaft of the engine and thereby start the engine. Hybrid powertrains use an engine in conjunction with one or more electric machines to optimize powertrain efficiency. One type of hybrid electric powertrain uses a belted-alternator-starter (BAS) in which the electric machine is coupled to the crankshaft, e.g., via a belt and pulley system. The auxiliary starter motor or the electric machine may be used to start the engine in some powertrain configurations, with torque from the engine used to power the electric machine in a generator mode to recharge an electrical storage system.

SUMMARY

A method is disclosed herein for providing fault-tolerant coasting control of a powertrain system having an internal combustion engine, an auxiliary starter motor, a first energy storage system (ESS), and a controller. In an example embodiment, the method includes receiving, via the controller, a measured real impedance value of the first ESS from a frequency analyzer device at the calibrated frequency ($\omega$), for instance 1000 Hz±500 Hz. This occurs while the engine is running. The method also includes comparing the measured real impedance value to a calibrated impedance value and enabling execution of a coasting maneuver of the powertrain system via the controller, i.e., turning off the engine above a threshold speed, e.g., vehicle or engine speed, only when the measured real impedance value is less than the calibrated threshold impedance value.

The method may also include starting the engine during the coasting maneuver using energy from a second ESS to thereby exit the coasting maneuver. This occurs when the measured real impedance value exceeds the calibrated impedance value. The method also includes preventing subsequent execution of the coasting maneuver in logic of the controller for as long as the measured real impedance value remains high relative to the calibrated impedance value.

An embodiment of the powertrain system is also disclosed herein having an engine, an auxiliary starter motor, a rechargeable ESS, a frequency analyzer device, and the controller noted above. The auxiliary starter motor is operatively connected to the engine and configured to selectively start the engine. The rechargeable ESS is electrically connected to the auxiliary starter motor. The controller is programmed to provide fault-tolerant coasting control of the powertrain system using the method noted above.

The second ESS in this embodiment may be a non-rechargeable or rechargeable device, e.g., a primary or secondary battery, respectively.

Starting the engine using energy from the second ESS may include activating a relay or other mechanical or semiconductor switch to connect the second ESS to the auxiliary starter motor. The second ESS may be a supercapacitor in some embodiments.

The detailed description and the drawings are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
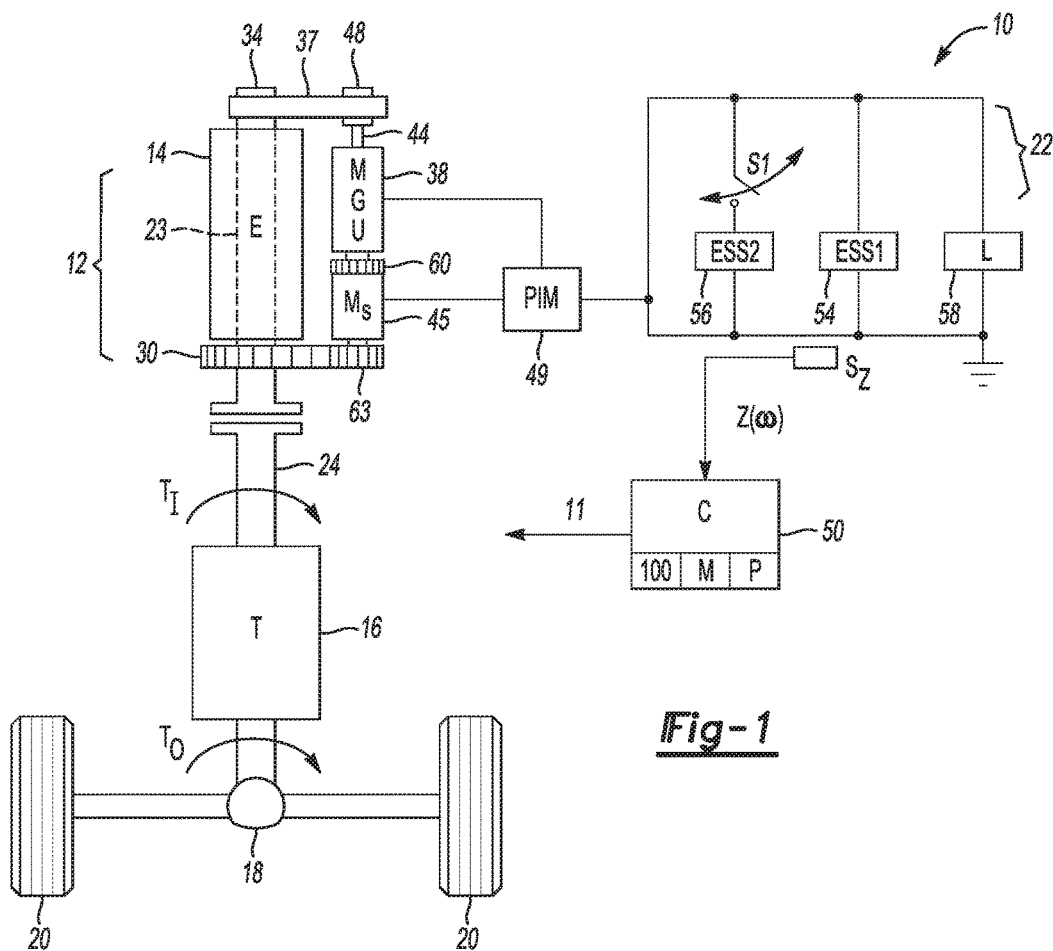
FIG. 1 is a schematic illustration of an example powertrain system having an engine and a controller programmed with fault-tolerant coasting control logic as set forth herein.

Referring to the Figures, wherein like reference numbers indicate like or corresponding parts throughout the several views, a powertrain system 10 is shown schematically in FIG. 1. In various embodiments, the powertrain system 10 may be any system having a powertrain 12 that includes an internal combustion engine (E) 14. The powertrain system 10 may be embodied variously as a vehicle, a power generation or manufacturing plant, a fluid pipeline pumping system, or any other system having periods of reduced or no load on the engine 14, where the action of stopping the engine 14 at certain points of operation would reduce fuel consumption and noise, and/or provide other benefits. Possible vehicular embodiments include mobile machines operable for transporting people or cargo, for instance conventional wheeled motor vehicles such as cars, trucks, buses, motorcycles, and bicycles, and may also include railed vehicles, watercraft, aircraft, or spacecraft depending on the configuration. For illustrative simplicity, a motor vehicle is used hereinafter, with the powertrain system 10 described hereinafter as a vehicle 10, without limiting applications to such an embodiment.

The vehicle 10 may include, in addition to the powertrain 12 and engine 14 noted above, a transmission (T) 16 and an electric machine 38, the latter of which is also labeled as MGU in FIG. 1 to indicate possible motor and generator functionality depending on the operating mode. The engine 14 and/or the electric machine 38 provide input torque (arrow $T_I$) to an input member 24 of the transmission 16. The transmission 16 may be coupled to drive wheels 20 of the vehicle 10 and deliver output torque (arrow $T_O$) via a final drive unit 18 in the non-limiting embodiment of the vehicle 10 shown in FIG. 1.

The powertrain 12 as configured herein includes an electrical system 22 operable for starting and stopping the engine 14 as needed, such as to conserve fuel. In the vehicle 10, this may occur while idling at a stoplight or at higher rates of speed of the vehicle 10 or engine 14 while coasting. As used herein, the terms "coasting" and "coasting maneuver" refer to an operating mode in which the vehicle 10 is operating above a particular speed, e.g., 50 MPH of ground speed, with the engine 14 turned off. Although omitted for illustrative clarity, the electrical system 22 may include other components such as power electronics, voltage regulators, power inverters, and the like.

A controller 50 is equipped with a frequency analyzer device $S_Z$, e.g., a microchip or circuit operable for directly measuring the impedance across first energy storage system 54 (ESS1) at a calibrated frequency ($\omega$) as set forth below with reference to FIG. 2. The controller 50 is also programmed to selectively prevent entry into the coasting maneuver when an abrupt/high-frequency fault, such as an electrical short or long-term failure of the first ESS 54, is detected via the frequency analyzer device $S_Z$. When the coasting maneuver is active, the controller 50 is operable for requesting an automatic start of the engine 14 via a second ESS 56 (ESS2). Possible embodiments of the electrical system 22 are described below with reference to FIGS. 3A-B. An example four-terminal packaging embodiment of the first and second ESS 54 and 56 is depicted in FIG. 4. An example method 100 for implementing fault-tolerant logic while cruising is described with reference to FIG. 5.

The controller 50 of FIG. 1 may be configured as a computing device having such common elements as the processor (P) and memory (M), the latter including tangible, non-transitory memory devices or media such as read only memory, random access memory, optical memory, flash memory, electrically-programmable read-only memory, and the like. The controller 50 may also include any required logic circuitry including but not limited to proportional-integral-derivative control logic, a high-speed clock, analog-to-digital circuitry, digital-to-analog circuitry, a digital signal processor, and the necessary input/output devices and other signal conditioning and/or buffer circuitry.

With respect to the example vehicle 10 of FIG. 1, a crankshaft 23 carrying torque from the engine 14 is selectively coupled to the input member 24 of the transmission 16. The transmission 16 may include a gearing arrangement and one or more clutches through which torque is transferred from the engine 14 to the input member 24, then to the final drive 18 and drive wheels 20. The drive wheels 20 can be front wheels and/or rear wheels of the vehicle 10 in alternative designs.

The vehicle 10 may be equipped with a belted alternator-starter (BAS) system as shown. In such an embodiment, an endless rotatable drive member 37 such as a closed loop of belt or chain is driven via a first pulley 34 or a second pulley 48 depending on the operating mode. The first pulley 34 may be coupled to the crankshaft 23 such that the first pulley 34 and the crankshaft 23 can rotate in unison. The electric machine 38 is likewise selectively coupled to the engine 14, with torque from the electric machine 38, powered by the electrical system 22 via a power inverter module (PIM) 49 when the electric machine 38 is a polyphase device, possibly harnessed to assist torque from the engine 14 or to charge an energy storage system (ESS1) 54 in reducing fuel consumption and emissions of the vehicle 10. For example, in certain embodiments the electric machine 38 can start the engine 14 from the belt side of the engine 14 via a second pulley 48 or provide torque to the crankshaft 23 to assist in propelling the vehicle 10, such as while coasting or sailing with the engine 14 turned off. The electric machine 38 can also be selectively utilized as a generator to generate electrical current or recharge the first ESS 54 and, in some embodiments, the second ESS 56.

An auxiliary starter motor 45 (Ms) may be selectively activated to deliver torque to the crankshaft 23. For example, the starter motor 45 may draw power from the electrical system 22, again via the PIM 49 if the starter motor 45 is a polyphase device or directly if a DC motor device. Once energized, the starter motor 45 can deliver motor torque via a gear element 63 to a ring gear 30 connected to the crankshaft 23 as shown, drawing power from the electrical system 22 as set forth below. The starter motor 45 may be engaged with the electric machine 38 in some embodiments, e.g., via the gear element 60 shown schematically in FIG. 1. Other embodiments may forego use of the separate starter motor 45 and use a 12 VDC electric machine 38 for engine starting and torque assist without departing from the scope of the disclosure.

The electric machine 38 includes a rotor shaft 44 that selectively transfers motor torque to the crankshaft 23 to start the engine 14. The second pulley 48 is coupled to the rotor shaft 44. For certain operations, the rotor shaft 44 and the second pulley 48 can rotate in unison, while in other operations the rotor shaft 44 and the second pulley 48 are rotatable separately or one rotates while the other does not.

With respect to the electrical system 22 of FIG. 1, the controller 50 is specially programmed to detect high-frequency failure modes, with "high-frequency" as used herein referring to electrical frequency as opposed to temporal frequency. Example high-frequency failure modes include an electrical short or a sudden loss of conductivity, either of which could inhibit starting of the engine 14 during a coasting maneuver. The controller 50 is also programmed to execute a control action with respect to the powertrain 12 via powertrain control signals (arrow 11) based on this evaluation, such as by preventing the vehicle 10 from coasting, setting a diagnostic code and alarm, etc. As is known in the art, while coasting along a stretch of highway, the state of the engine 14 may oscillate, i.e., turn on and off, depending on the optimal hybrid drive mode. When the engine 14 is turned off, the first ESS 54 can excite the electric machine 38. Thus, if an electrical short occurs in the first ESS 54, the engine 14 cannot be restarted, and as a result, any engine-driven power systems, collectively represented in FIG. 1 as an auxiliary load (L) 58, cannot be activated. The controller 50 is therefore programmed with computer-readable instructions embodying the method 100 to prevent such an occurrence via early detection of high-frequency electrical failures, and to prevent entry into a coasting maneuver when such a failure mode is present or is likely to be present during a particular coasting maneuver.

To achieve the desired ends, the controller 50 may include or be placed in communication with the frequency analyzer device $S_Z$, which is operable for measuring a total impedance $Z(\omega)$ across the first ESS 54 at a calibrated frequency ($\omega$) when the engine 14 is running. The second ESS 56 may be evaluated in the same manner. In a particular non-limiting example embodiment, the calibrated frequency ($\omega$) is about 1000 Hz. That is, a typical duration (T) of a peak power pulse when cranking and starting the engine 14 is about 1 millisecond, which corresponds to a frequency ($\omega$) equal to $$\frac{1}{T},$$

or 1000 Hz. Sufficient performance may be enjoyed within a reasonable band of this frequency, e.g., 1000 Hz±500 Hz. Embodiments of greater than 1500 Hz or less than 500 Hz may be used within the scope of the disclosure, e.g., 1 Hz-1 MHz. However, at least with respect to higher frequencies, inductive effects can result that may be difficult to characterize.

In the example embodiment of FIG. 1, the second ESS 56 may be embodied as a primary battery, i.e., a replaceable battery that cannot be recharged. Such a device has a small mass relative to the first ESS 54 and may be sized for a limited number of starts, e.g., 5-10 starts, before requiring replacement. A series of 3 VDC, 1200 mAh polycarbon monofluoride lithium batteries may be used in a possible configuration, or any other suitably rugged consumable high/low temperature design. Such a small battery is intended for emergency cranking of the engine 14 to allow an operator of the vehicle 10 of FIG. 1 to smoothly exit a coasting maneuver when the impedance of the first ESS 54 is above a calibrated impedance value. Therefore, when the controller 50 detects impedance above a calibrated impedance value at, e.g., 1000 Hz±500 Hz as noted above, the controller 50 can command closing of a switch S1 to connect the second ESS 56 to the electric machine 38.

Figure 2:
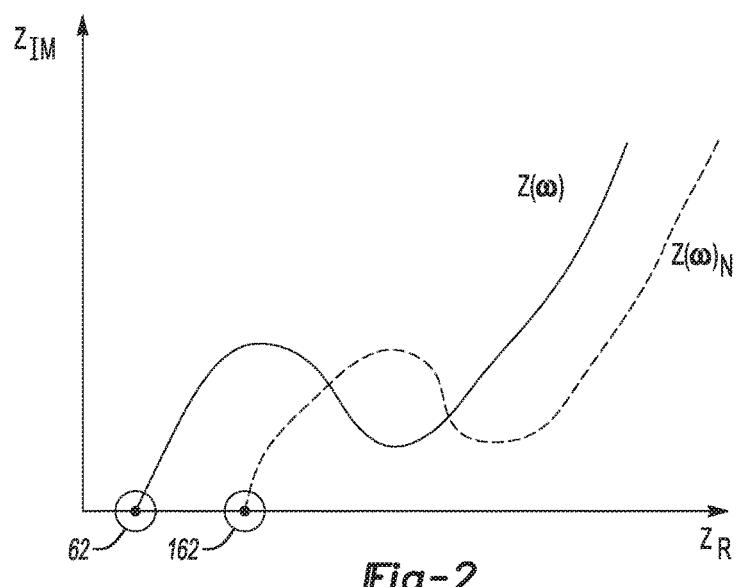
FIG. 2 is a schematic illustration of impedance values of an example energy storage system of the powertrain system shown in FIG. 1.

Referring briefly to FIG. 2, an example impedance curve $Z(\omega)$ has imaginary and real terms, as is known in the art, with imaginary impedance $(Z_{IM})$ represented on the vertical axis and real impedance $(Z_R)$ represented on the horizontal axis as shown.

$$Z(\omega) = \sqrt{[(Z_{IM})^2 + (Z_R)^2]}$$

A calibrated new ESS 54 may have the total impedance curve $Z(\omega)$, with a high-frequency intercept point 62 indicative of pure ohmic drop. As a given ESS experiences a high-frequency failure such as an electrical short or loss of conductivity, e.g., due to age, the impedance curve will shift to the right in FIG. 2 to a define a new impedance curve $Z(\omega)_N$ and a new intercept point 162.

The controller 50 can request measurement of the total impendence of the ESS 54 or 56 at the calibrated frequency ($\omega$) using the frequency analyzer device $S_Z$, compare the measured impedance to a calibrated impedance value, and execute a control action with respect to the powertrain 12 if and when the measured impedance exceeds the calibrated impedance value. That is, the controller 50 can ensure that the engine 14 is not turned off when the measured impedance exceeds the calibrated impedance value, in addition to executing other control actions prompting service. In a particular embodiment, the frequency analyzer device $S_Z$ may be an integrated circuit or chip operable for directly measuring the impedance to a high degree of accuracy. As electrical currents are generally low in the electrical system 22, calculation of the impedance from voltage and current may not produce optimal accuracy, and therefore the frequency analyzer device $S_Z$ provides an accurate hardware solution that may be used as part of the electrical system 22.

Figure 3A:
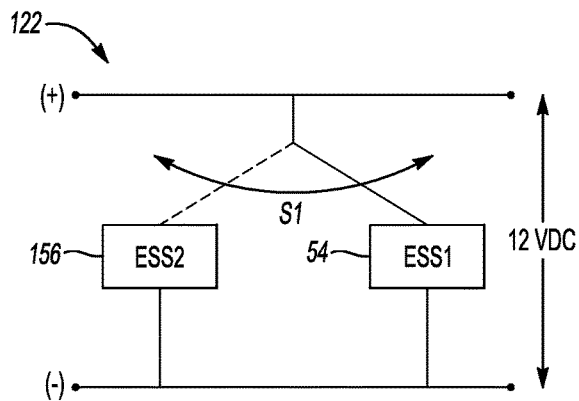
FIGS. 3A-B are schematic illustrations of possible configurations of alternative embodiments of an electrical system usable as part of the powertrain system shown in FIG. 1.
Figure 3B:
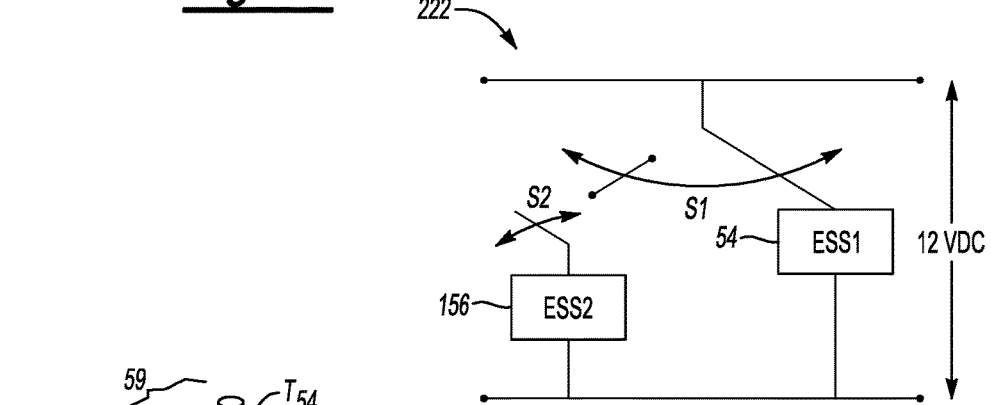
Figure 4:
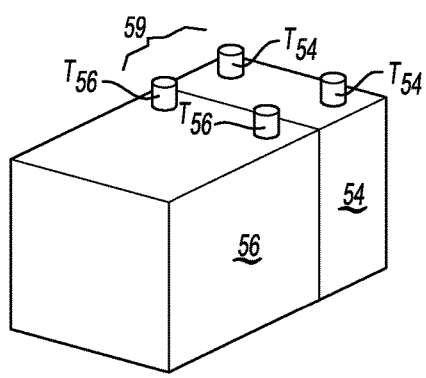
FIG. 4 is a schematic illustration of an example four-terminal design of energy storage systems usable in the powertrain system of FIG. 1 for independent fault diagnostics.

Referring to FIGS. 3A and 3B, showing two possible electrical systems 122 and 222, a primary battery embodiment of the second ESS 56 of FIG. 1 may be alternatively embodied as a second ESS 156 having a secondary/rechargeable configuration. The first and second ESS 54 and 156 may be similar or identical modules arranged in electrical parallel, for instance as two identical lead acid battery modules. First switch (S1) may be commanded by control signals (arrow 11) from the controller 50 to selectively disconnect one of the first and second ESS 54 and 156 from the powertrain 12 as needed based on the impedance evaluation conducted by the controller 50 at the calibrated frequency ($\omega$), as shown in the example 12 VDC electrical system 122 of FIG. 3A.

In FIG. 3B, the second ESS 156 in the electrical system 222 may be a supercapacitor sized to restart the engine 14 or accept a charge from the engine 14 as needed. In a normal mode, switch S2 opens and switch S1 closes, thereby connecting the first ESS 54 to the electric machine 38. In a coasting protection mode, switch S1 can open, thereby disconnecting the first ESS 54 and connecting the second ESS 156. At the same time, the controller 50 can record a diagnostic code alerting an operator of the vehicle 10 of FIG. 1 to service the first ESS 54 and also prevent the powertrain 12 from executing a coasting maneuver until the first ESS 54 has been repaired or replaced.

Referring to FIG. 4, in the embodiments noted above, the respective first and second ESS 54 and 56 may be packaged together such that the first ESS 54 is immediately adjacent to the second ESS 56 to form a single battery module 59. However, each of the first and second ESS 54 and 56 maintains its own positive and negative terminals $T_{54}$ and $T_{56}$, such that the battery module 59 is a four-terminal design as shown. The use of four terminals instead of just two enables independent evaluation and diagnostics of the first and second ESS 54 and 56. In this manner, complete fault tolerance is provided for both of the first and second ESS 54 and 56. The four-terminal configuration also protects the second ESS 56 from disconnection in the event the first ESS 54 becomes disconnected, which would not be possible in a two-terminal design.

Figure 5:
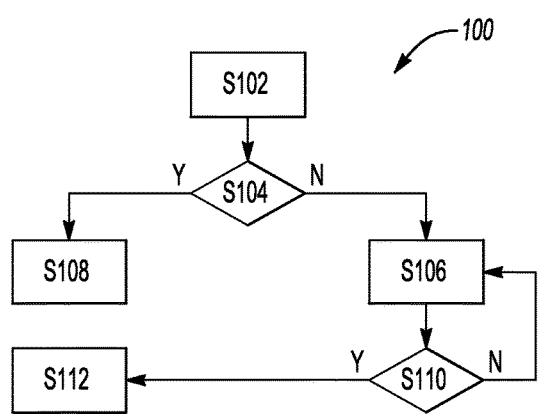
FIG. 5 is a flow chart describing an example method for performing fault-tolerant control of a coasting maneuver of the powertrain system shown in FIG. 1.

FIG. 5 depicts an example method 100 for providing fault-tolerant coasting control of the powertrain 12 of FIG. 1 in any of its disclosed embodiments. Beginning with step S102, the controller 50 receives the impedance measurements from the frequency analyzer device $S_Z$ of FIG. 1 at the calibrated frequency ($\omega$) while the engine 14 is running and delivering all of the required input torque to the transmission 16. The method 100 proceeds to step S104, but continues to receive the impedance measurements periodically according to predetermined sampling loop.

Step S104 includes comparing the measured impedance value from step S102 to a calibrated impedance value. The method 100 proceeds to step S106 when a value less than the calibrated impedance value is detected, or to step S108 in the alternative when a value exceeding the calibrated impedance value is detected, or as noted below, an impedance trajectory indicates that the measured impedance will likely exceed the calibrated impedance value during the coasting maneuver.

At step S106, the controller 50 enables the coasting/sailing maneuver. Step S106 may entail setting a bit flag or permission in memory (M) such that a separate controller, or the controller 50, can thereafter allow the engine 14 to turn off and coasting to commence. The method 100 then proceeds to step S110.

At step S108, the controller 50 disables the coasting maneuver. Step S108 may entail setting a bit flag or permission in memory (M) such that a separate controller, or the controller 50, can thereafter prevent the engine 14 from turning off and coasting. Step S108 may also include setting a diagnostic code in memory (M) and possibly activating an indicator lamp within the vehicle 10, sending a text message, or otherwise alerting an operator of the vehicle 10 to the need to service the first ESS 54, or the second ESS 56 or 156 depending on which device is being evaluated.

Step S110 includes determining, while coasting, whether the received impedance value remains less than the calibrated impedance value noted above. That is, the first ESS 54 may experience a fault while the powertrain 12 is actively coasting, or the controller 50 may determine that such a fault is likely to occur after entering the coasting maneuver as set forth below. In this event, the method 100 proceeds to step S112.

At step S112, the controller 50 may execute another control action with respect to the powertrain 12. In this instance, the controller 50 may activate the first switch S1 of FIG. 3A to connect the second ESS 56 to the starter motor 45, thereby starting the engine 14 and exiting the coasting maneuver, thereafter proceeding to step S108. Or, the controller 50 may activate the first and second switches S1 and S2 of FIG. 3B to connect the supercapacitor embodiment of the second ESS 156 to the starter motor 45 of FIG. 1, thereby starting the engine 14. Once started, the supercapacitor can be recharged, e.g., using an alternator generator or other electric power generating device (not shown) powered via the engine 14.

Those of ordinary skill in the art will appreciate that other variations of the method 100 may be contemplated. For instance, a look-ahead or preemptive embodiment may be envisioned in which the engine 14 of FIG. 1 is not allowed to turn off and enter the coasting maneuver if the controller 50 determines that an impedance change trajectory will cause the measured impedance of the first ESS 54 to exceed the calibrated impedance value during the coasting maneuver.

That is, rather than evaluating the impedance of the first ESS 54 at the point in time at which the coasting maneuver is to be commanded or enabled by the controller 50, the controller 50 may calculate an impedance trajectory using the measured real impedance value, and then enable the coasting maneuver only when the measured real impedance value is less than the calibrated impedance value and the impedance trajectory will not result in the measured impedance value exceeding the calibrated impedance value during the duration of the coasting maneuver.

For instance, the controller 50 may evaluate the change in impedance at a plurality of different time points over a calibrated interval prior to entry into the coasting maneuver. By projecting the change in impedance forward in time over a likely duration of the coasting maneuver, the controller 50 can quickly determine whether the impedance of the first ESS 54 will rise above the calibrated impedance value during the course of the coasting maneuver. In such an event, the controller 50 can prevent entry into the coasting maneuver in a preemptive manner and execute the required control actions noted above, e.g., setting a diagnostic code or otherwise alerting an operator as to the current state of the ESS 54.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain system comprising:
an internal combustion engine;
an auxiliary starter motor operatively connected to the engine and configured to selectively start the engine;
a rechargeable energy storage system electrically connected to the auxiliary starter motor;
a frequency analyzer device; and
a controller programmed to provide fault-tolerant coasting control of the powertrain system, wherein the controller is programmed to:
receive a real impedance value of the rechargeable energy storage system from the frequency analyzer device at a calibrated frequency while the engine is running;
compare the real impedance value to a calibrated impedance value; and
execute a coasting maneuver of the powertrain system by turning off the engine above a threshold speed only when the real impedance value is less than the calibrated impedance value.

2. The powertrain system of claim 1, further comprising an additional energy storage system in electrical parallel with the rechargeable energy storage system, wherein the controller is programmed to:
command a starting of the engine using energy from the additional energy storage system to thereby exit the coasting maneuver when the real impedance value exceeds the calibrated impedance value; and
prevent a subsequent execution of the coasting maneuver as long as the real impedance value exceeds the calibrated impedance value.

3. The powertrain system of claim 2, wherein the additional energy storage system is a non-rechargeable device.

4. The powertrain system of claim 2, wherein the additional energy storage system is a rechargeable device.

5. The powertrain system of claim 2, wherein the controller is programmed to command starting of the engine by activating a switch to thereby connect the additional energy storage system to the auxiliary starter motor.

6. The powertrain system of claim 2, wherein the controller is programmed to calculate an impedance trajectory using the real impedance value, and to enable execution of the coasting maneuver only when the real impedance value is less than the calibrated impedance value and the calculated impedance trajectory will not result in the real impedance value exceeding the calibrated impedance value during the coasting maneuver.

7. The powertrain system of claim 2, wherein the calibrated frequency is 1000 Hz±500 Hz.

8. The powertrain system of claim 2, further comprising an additional energy storage system in electrical parallel with the rechargeable energy storage system, wherein the additional energy storage system and the rechargeable energy storage system have separate positive and negative terminals with respect to each other.

9. The powertrain system of claim 2, wherein the threshold speed is a speed of the engine.

10. The powertrain system of claim 2, wherein the threshold speed is a speed of the vehicle.

11. A powertrain system comprising:
an internal combustion engine;
an auxiliary starter motor operatively connected to the engine and configured to selectively start the engine;
a rechargeable energy storage system electrically connected to the auxiliary starter motor;
a frequency analyzer device; and a controller programmed to provide fault-tolerant coasting control of the powertrain, wherein the controller is programmed to:
receive a real impedance value of the rechargeable energy storage system from the frequency analyzer device at a calibrated frequency while the engine is running;
compare the real impedance value to a calibrated impedance value;
calculate an impedance trajectory using the real impedance value; and
execute a coasting maneuver of the powertrain by turning off the engine above a threshold speed only when the real impedance value is less than the calibrated impedance value and the calculated impedance trajectory will not result in the real impedance value exceeding the calibrated impedance value during the coasting maneuver.

* * * * *